US010678321B2

United States Patent
Messick et al.

(10) Patent No.: US 10,678,321 B2
(45) Date of Patent: Jun. 9, 2020

(54) SYSTEMS AND METHODS FOR REDUCED BOOT POWER CONSUMPTION USING EARLY BIOS CONTROLLED CPU P-STATES TO ENHANCE POWER BUDGETING AND ALLOCATION

(71) Applicant: Dell Products L.P., Round Rock, TX (US)

(72) Inventors: Doug E. Messick, Austin, TX (US); Jordan Chin, Austin, TX (US); Rui Shi, Cedar Park, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 16/116,053

(22) Filed: Aug. 29, 2018

(65) Prior Publication Data

US 2020/0073463 A1 Mar. 5, 2020

(51) Int. Cl.
  *G06F 1/32* (2019.01)
  *G06F 9/44* (2018.01)
  *G06F 1/3234* (2019.01)
  *G06F 9/4401* (2018.01)

(52) U.S. Cl.
  CPC .......... *G06F 1/3234* (2013.01); *G06F 9/4401* (2013.01)

(58) Field of Classification Search
  CPC .............................. G06F 1/3234; G06F 9/4401
  See application file for complete search history.

(56) References Cited

U.S. PATENT DOCUMENTS

| 7,437,575 | B2* | 10/2008 | Dennis | G06F 1/3203 |
| | | | | 713/300 |
| 9,336,106 | B2* | 5/2016 | Phuong | G06F 1/26 |
| 2008/0270652 | A1* | 10/2008 | Jeansonne | G06F 21/53 |
| | | | | 710/108 |
| 2010/0191989 | A1* | 7/2010 | Khatri | G06F 1/3203 |
| | | | | 713/310 |

\* cited by examiner

*Primary Examiner* — Stefan Stoynov

(74) *Attorney, Agent, or Firm* — Baker Botts L.L.P.

(57) ABSTRACT

Systems and methods for reduced boot power consumption using early BIOS controlled CPU power states to enhance power budgeting and allocation. An information handling system may include a server. The server may include a central processing unit (CPU), a memory, a non-volatile random-access memory (NVRAM) device, a performance state (P-state) limiting indicator stored in the NVRAM device, a P-state value stored in the NVRAM, and a basic input/output system (BIOS) stored in the memory. The BIOS may read a power state limiting indicator stored in the NVRAM device and when the power state limiting indicator indicates that power state limiting is enabled, read a power state value stored in the NVRAM, and program the power state of the CPU to the power state value to cause the CPU to limit power supplied to the CPU to the power state value.

20 Claims, 6 Drawing Sheets

SYSTEMS AND METHODS FOR REDUCED BOOT POWER CONSUMPTION USING EARLY BIOS CONTROLLED CPU P-STATES TO ENHANCE POWER BUDGETING AND ALLOCATION

BACKGROUND

Field of the Disclosure

This disclosure relates generally to information handling systems and, more particularly, to systems and methods for reduced boot power consumption using early BIOS controlled CPU P-states to enhance power budgeting and allocation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed information handling system may include a first server. The first server may include a first central processing unit (CPU), a memory, a first non-volatile random-access memory (NVRAM) device, a first performance state (P-state) limiting indicator stored in the NVRAM device, a first P-state value stored in the NVRAM, and a first basic input/output system (BIOS) stored in the memory. The BIOS may read a first power state limiting indicator stored in the NVRAM device and when the first power state limiting indicator indicates that power state limiting is enabled, read a first power state value stored in the NVRAM, and program the power state of the first CPU to the first power state value to cause the first CPU to limit power supplied to the first CPU to less than or equal to the first power state value. When a BIOS checkpoint event occurs during execution of the BIOS, the first CPU may cease to limit CPU power supplied to the first CPU. The BIOS checkpoint event may occur after the power state of the first CPU has been programmed.

In a number of the disclosed embodiments of the information handling system, the first server may further include a first system management controller. The first system management controller may, when power state limiting is enabled, calculate an optimal first boot power allocation (BPA) value and a first range of BPA values based on a power capability of the first server. The optimal first BPA value may be within the first range of BPA values. The first power state value stored in the NVRAM may be the calculated optimal BPA value.

In a number of the disclosed embodiments of the information handling system, the first server may further include a first system management controller. The first system management controller may calculate an optimal BPA value based on a power capability of the first server, read a user power cap value stored in the NVRAM, calculate a minimum power state value as the minimum of the calculated optimal BPA value and the user power cap value. The first power state value stored in the NVRAM may be the minimum power state value.

In a number of the disclosed embodiments of the information handling system, when the first power state limiting indicator indicates that power state limiting is disabled, the power supplied to the first CPU may be unconstrained.

In a number of the disclosed embodiments of the information handling system, the BIOS may, when the first power state limiting indicator indicates that power state limiting is disabled, read a second power state limiting indicator stored in the NVRAM device, and when the second power state limiting indicator indicates that power state limiting is enabled, read a second power state value stored in the NVRAM, and program the power state of the first CPU to the second power state value that may cause the first CPU to limit power supplied to the first CPU to less than or equal to the second power state value. The second power state value may be greater than the first power state value.

In a number of the disclosed embodiments of the information handling system, the information handling system may further include a second server and a chassis management controller. The chassis management controller may, when power state limiting transitions from enabled to disabled, re-allocate the power supplied to the first server from a first optimized BPA value to a first BPA value and re-allocate the power supplied to the second server from a second optimized BPA value to a second BPA value. The chassis management controller may also, when power state limiting transitions from disabled to enabled re-allocate the power supplied to the first server from the first BPA value to the first optimized BPA, and re-allocate the power supplied to the second server from the second BPA value to the second optimized BPA value. The first optimized BPA value may be less than the first BPA value. The second optimized BPA value may be less than the second BPA value.

In a number of the disclosed embodiments of the information handling system, the first server may further include a first system management controller. The first system management controller may calculate an optimal first BPA value and a first range of BPA values based on a power capability of the first server. The information handling system may further include a second server. The second server may include a second CPU, and a second system management controller. The second system management controller may calculate an optimal second BPA value and a second range of BPA values based on a power capability of the second server. The information handling system may also include a chassis management controller. The chassis management controller may, when power state limiting is enabled, receive the optimal first BPA value and the first range of BPA values from the first system management controller, receive the optimal second BPA value and the second range BPA values from the second system management controller, and calculate a third BPA value for the first server and a fourth BPA value for the second server based on a chassis power budget, the optimal first BPA value, the first range of BPA values, the optimal second BPA value, and the second range of BPA values. The third BPA value may be within the first range of BPA values and the fourth BPA value may be within the second range of BPA values. The chassis management controller may send the third BPA value to the first system management controller. When power state limiting is enabled, the power supplied to the first CPU may be limited to the third BPA value. The chassis management controller may send the fourth BPA value to the second system management controller. When power state limiting is enabled, the power supplied to the second CPU may be limited to the fourth BPA value.

In a number of the disclosed embodiments of the information handling system, the third BPA value may be less than the optimal first BPA value.

In a number of the disclosed embodiments of the information handling system, the chassis management controller may further receive a user power cap value from a user interface of the chassis management controller. The calculation of the third BPA value and the fourth BPA value may be further based on the user power cap value. The sum of the third BPA value and the fourth BPA value may be less than or equal to the user power cap value.

In a number of the disclosed embodiments of the information handling system, the user power cap value may be less than the sum of the power capability of the first server and the power capability of the second server.

In a second embodiment, a disclosed method may include reading, by a basic input/output system (BIOS) of a first server of an information handling system, a first power state limiting indicator stored in a first non-volatile random-access memory (NVRAM) device of the first server. The method may also include, when the first power state limiting indicator indicates that power state limiting is enabled, reading, by the BIOS, a first power state value stored in the NVRAM and programming, by the BIOS, a power state of a first central processing unit (CPU) of the first server to the first power state value that may cause the first CPU to limit power supplied to the first CPU to less than or equal to the first power state value. When a BIOS checkpoint event occurs during the BIOS, ceasing, by the first CPU, to limit CPU power supplied to the first CPU. The BIOS checkpoint event may occur after the power state of the first CPU has been programmed.

In a number of the disclosed embodiments of the method, the method may also include, when power state limiting is enabled, calculating, by a first system management controller of the first server, an optimal first boot power allocation (BPA) value and a first range of BPA values based on a power capability of the first server. The optimal first BPA value may be within the first range of BPA values. The first power state value stored in the NVRAM may be the calculated optimal BPA value.

In a number of the disclosed embodiments of the method, the method may also include, calculating, by a first system management controller of the first server, an optimal BPA value based on a power capability of the first server, reading, by the first system management controller, a user power cap value stored in the NVRAM, and calculating, by the first system management controller, a minimum power state value as the minimum of the calculated optimal BPA value and the user power cap value. The first power state value stored in the NVRAM may be the minimum power state value.

In a number of the disclosed embodiments of the method, the method may also include, when the first power state limiting indicator indicates that power state limiting is disabled, the power supplied to the first CPU may be unconstrained.

In a number of the disclosed embodiments of the method, the method may also include, when the first power state limiting indicator indicates that power state limiting is disabled, reading, by the BIOS, a second power state limiting indicator stored in the NVRAM device. The method may also include, when the second power state limiting indicator indicates that power state limiting is enabled, reading, by the BIOS, a second power state value stored in the NVRAM, and programming, by the BIOS, the power state of the first CPU to the second power state value that may cause the first CPU to limit power supplied to the first CPU to less than or equal to the second power state value. The second power state value may be greater than the first power state value.

In a number of the disclosed embodiments of the method, the method may also include, when power state limiting transitions from enabled to disabled, re-allocating, by a chassis management controller of the information handling system, the power supplied to the first server from a first optimized BPA value to a first BPA value, and re-allocating, by the chassis management controller, the power supplied to a second server of the information handling system from a second optimized BPA value to a second BPA value. The method may also include, when power state limiting transitions from disabled to enabled, re-allocating, by the chassis management controller, the power supplied to the first server from the first BPA value to the first optimized BPA, and re-allocating, by the chassis management controller, the power supplied to the second server from the second BPA value to the second optimized BPA value. The first optimized BPA value may be less than the first BPA value. The second optimized BPA value may be less than the second BPA value.

In a number of the disclosed embodiments of the method, the method may also include, calculating, by a first system management controller of the first server, an optimal first BPA value and a first range of BPA values based on a power capability of the first server. The method may also include calculating, by a second system management controller of a second server, an optimal second BPA value and a second range of BPA values based on a power capability of the second server. The method may further include, when power state limiting is enabled, receiving, by a chassis management controller of the information handling system, the optimal first BPA value and the first range of BPA values from the first system management controller, receiving, by the chassis management controller, the optimal second BPA value and the second range BPA values from the second system management controller, calculating, by the chassis management controller, a third BPA value for the first server and a fourth BPA value for the second server based on a chassis power budget, the optimal first BPA value, the first range of BPA values, the optimal second BPA value, and the second range of BPA values. The third BPA value may be within the first range of BPA values and the fourth BPA value may be within the second range of BPA values. The method may also include, sending, by the chassis management controller, the third BPA value to the first system management controller. When power state limiting is enabled, the power supplied to the first CPU may be limited to the third BPA value. The method may further include sending, by the chassis management controller, the fourth BPA value to the second system management controller. When power state limiting is enabled, the power supplied to the second CPU may be limited to the fourth BPA value.

In a number of the disclosed embodiments of the method, the third BPA value may be less than the optimal first BPA value.

In a number of the disclosed embodiments of the method, the method may also include, receiving, by the chassis management controller, a user power cap value from a user interface of the chassis management controller. The calculation of the third BPA value and the fourth BPA value may be further based on the user power cap value. The sum of the third BPA value and the fourth BPA value may be less than or equal to the user power cap value.

In a number of the disclosed embodiments of the method, the user power cap value may be less than the sum of the power capability of the first server and the power capability of the second server.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
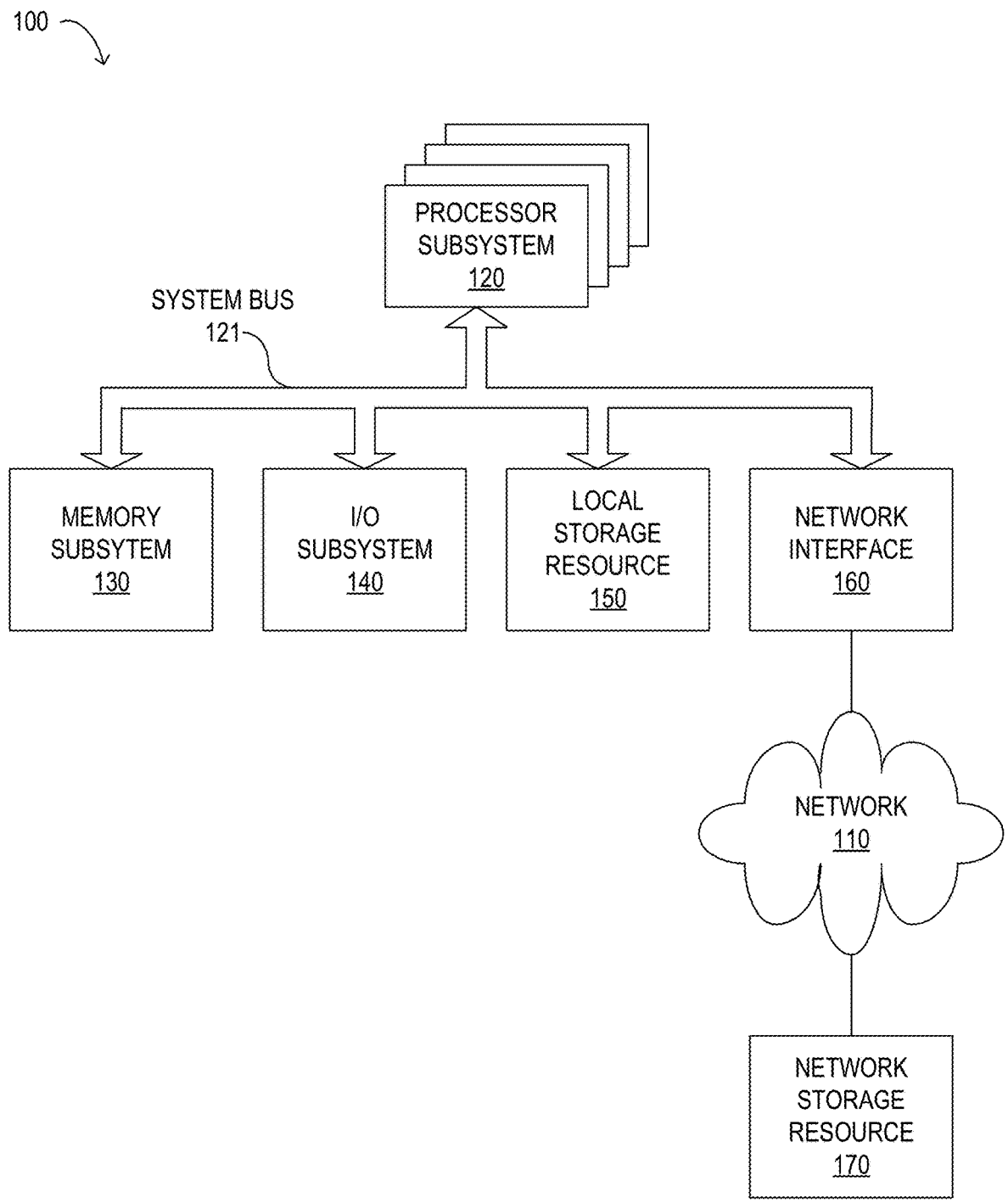
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, 5, and 6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Typical server systems include power inventory and budgeting features to protect these systems from power related faults that may occur during boot and runtime operation. These server systems utilize extensive empirical power characterization data collected on each system to provide the various features. These power inventory and budgeting features may include power supply unit (PSU) fault handling, power capping, power excursions, power supply redundancy, and fault tolerant redundancy. Some of these power inventory and budgeting features rely on power control mechanisms such as CPU throttling to reduce power consumption. However, CPU throttling mechanisms may limit the types of power reduction that can be provided and negatively impact their effectiveness. For example, Intel® power management architecture requires the basic input/output system (BIOS) to complete power management configurations and then set a check point completion bit, check point level 3 complete (CPL3) before CPU throttling is available. The unavailability of CPU throttling allows power spikes generated by the CPU and BIOS activity to be completely unmanaged during the time the server system boots and enters the BIOS to the time the checkpoint completion bit is set. In addition, the BIOS does not complete power management and CPL3 until approximately two-thirds of the way through BIOS power-on-self-test (POST), thus leaving open a very large window of vulnerability for uncontrolled power excursions. These uncontrolled power excursions allow the CPU to approach thermal design power (TDP) levels during boot which can be significantly high when a platform has two or four CPUs each with a TDP as much as 200 W or more. This behavior requires power budgeting features to utilize high boot power allocation values to account for these significantly high-power excursions, which impacts power budgeting features, right-sizing power supply units (PSUs), and recommended power cap limits.

As will be described in further detail herein, the inventors of the present disclosure have discovered systems and methods for reduced boot power consumption using early BIOS controlled CPU P-states to enhance power budgeting and allocation. In the present solution, the boot power consumption of an information handling system is reduced by limiting CPU power during boot using a power state limiting mechanism, using an optimized boot power allocation process for power budgeting when power state limiting is enabled on one or more server systems in the information handling system, and optimizing power budgeting and power allocations for each of the server systems in the information handling system. In this solution, the power and performance are limited only during the time the BIOS starts to the time the power management configurations have been completed, when power management features are unavailable. When the power management configurations have completed, and the power management feature are available, power state limiting ceases. The solution provides user selectable and backwards compatible mechanisms that limit boot power with minimal side effects, solves an industry wide problem, and eliminates or mitigates CPU power excursions and power limiting issues.

Figure 2:
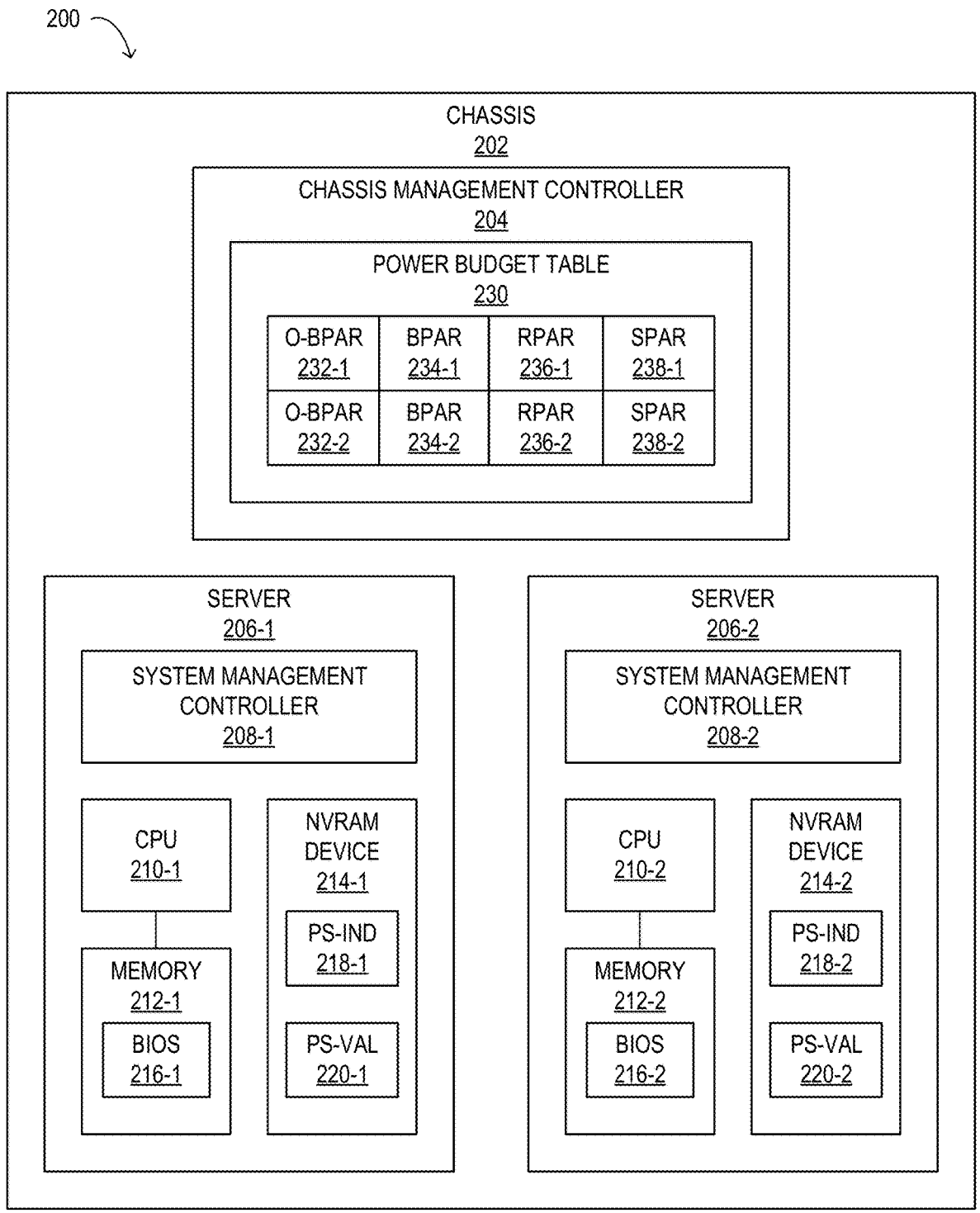
FIG. 2 is a block diagram of selected elements of an embodiment of an exemplary information handling system including a chassis for reduced boot power consumption using early BIOS controlled CPU power states to enhance power budgeting and allocation.

Turning now to FIG. 2, a block diagram depicting selected elements of an embodiment of an exemplary information handling system 200 for reduced boot power consumption using early BIOS controlled CPU power states to enhance power budgeting and allocation. As shown in FIG. 2, components of information handling system 200 may include, but are not limited to, a chassis 202, a chassis management controller 204, servers 206 including server 206-1 and server 206-2. Server 206-1 may include a system management controller 208-1, a CPU 210-1, a memory 212-1, and a non-volatile random-access memory (NVRAM) device 214-1, a BIOS 216-1 stored in memory 212-1, a power state indicator (PS-IND) 218-1 stored in NVRAM device 214-1, and a power state value (PS-VAL) 220-1 stored in NVRAM device 214-1. Similarly, server 206-2 may include a system management controller 208-2, a CPU 210-2, a memory 212-2, and a non-volatile random-access memory (NVRAM) device 214-2, a BIOS 216-2 stored in memory 212-2, a power state indicator (PS-IND) 218-2 stored in NVRAM device 214-2, and a power state value (PS-VAL) 220-2 stored in NVRAM device 214-2. Although each server 206 is shown having only one CPU 210, it will be understood that server 206 may include one or more CPUs 210. Chassis management controller 204 may include a power budget table 230. Power budget table (PBT) 230 may include optimized boot power allocation request (O-BPAR) values 232 including O-BPAR value 232-1 and O-BPAR 232-2, boot power allocation request (BPAR) values 234 including BPAR value 234-1 and BPAR 234-2, runtime power allocation request (RPAR) values 236 including RPAR value 236-1 and RPAR 236-2, and shutdown power allocation request (SPAR) values 238 including SPAR value 238-1 and SPAR 232-2. O-BPAR 232-1, BPAR 234-1, RPAR 236-1, and SPAR 238-1 are associated with CPU 210-1 of server system 206-1. O-BPAR 232-2, BPAR 234-2, RPAR 236-2, and SPAR 238-2 are associated with CPU 210-2 of server system 206-1.

PBT 230 power budget feature set may include four different power allocation requests associated with each server 206 that include run-time power allocation requests (RPAR) RPARs 236, boot time power allocation requests (BPAR) BPARs 234, off power allocation requests (SPAR) SPARs 233, and optimized boot-time power allocation requests (O-RPAR) O-BPARs 232. Each power allocation request (PAR) may include three primary attributes including peak power (FTB), thermal design power (TDP)(FTR), and throttled power (NLB). During operation, FTP (Peak power) may be greater than FTR (TDB) which may be greater than NLB throttled power, and that run time power is greater than boot power. However, due to unexpectedly high-power consumption during server boot time operation, BPAR 234 may be greater than RPAR 236. Chassis management controller 204 may utilize these PARs to budget and allocate power to the various components within chassis 204 during boot-time, run-time, and off-state operation.

In particular, chassis management controller 204 may limit the power supplied to a CPU 210 during boot-time operation using power state limiting, optimized O-BPAR 232 attribute values, and optimized power budgeting and power allocations. When a particular server 206 such as server 206-1 is powered on, system management controller 208-1 may utilize power state limiting to a limit CPU 210-1 to a specific power state when chassis management controller 204 applies throttling to server 206. System management controller 208-1 may store a particular power state indicator value at PS-IND 218-1 in NVRAM device 214-1 to indicate that power state limiting during boot is needed. System management controller 208-1 may also store a particular power state value at PS-VAL 220-1 in NVRAM device 214-1, which is associated with the particular power state indicator value at PS-IND 218-1. A default power state value may be Pn, which is a low-frequency CPU mode. Additional power state values may also be used between Pn to P1. In one or more embodiments NVRAM device 214-1 may comprise a complex programmable logic device (CPLD) and a non-volatile configuration memory of the CPLD may be used to store PS-IND 218-1 and PS-VAL 220-1. In one or more other embodiments, a single CPLD bit may be used for PS-IND 218-1 to signal that power state limiting is needed. Additional CPLD bits may also be used for additional power state options from Pn to P1.

At the start of boot of server 206-1, BIOS 216-1 may read PS-IND 218-1 from NVRAM device 214-1. When PS-IND 218-1 indicates that power state limiting is enabled, BIOS 216-1 may read PS-VAL 220-1 from NVRAM device 214-1. BIOS 216-1 may program PS-IND 218-1 of CPU 210-1 to PS-VAL 220-1 to cause CPU 210-1 to limit power supplied to CPU 210-1 to less than or equal to PS-VAL 220-1. In one or more embodiments, server 206-1 may be an Intel® type server and BIOS 216-1 may program PS-IND 218-1 by sending "SET_CORE_MESH_RATIO (0×AF)" with the corresponding PS-VAL 220-1 to the Pcode of CPU 210-1 using the "BIOS_MAILBOX_INTERFACE" for all threads. Once PS-IND 218-1 of CPU 210-1 to PS-VAL 220-1 has been programmed, CPU 210-1 will limit CPU 210-1 to the specified power state which will control power spikes during the next boot. Server 206-1 will return to normal, full performance, operation capability after a BIOS checkpoint event has occurred during execution of BIOS 216-1 and CPU 210-1 may cease to limit the power supplied to CPU 210-1. The BIOS checkpoint event may occur after PS-IND 218-1 of CPU 210-1 to PS-VAL 220-1 has been programmed. In one or more embodiments, the BIOS checkpoint event may comprise completion of Intel® BIOS checkpoint level 3. Using power state limiting may increase, but the increase may be minimal because limiting CPU 210-1 to Pn is less aggressive that hardware throttling, PROCHOT #, and Pn only affect the boot time prior to the BIOS checkpoint event.

System management controller 208-1 may also utilize an optimized boot power allocation request feature (O-BPAR) feature for power budgeting when power state limiting is enabled. When PS-IND 218-1 indicates that power state limiting is enabled, system management controller 208-1 may calculate an O-BPAR value and a range of BPA values based on a power capability of server 206-1. O-BPAR 232-1 value may be significantly less than BPAR 234-1 because uncontrolled power excursions during boot are prevented, which lowers the worst-case boot power for a given server 206. O-BPAR 232-1 value may be within the range of BPA values. The range of BPA values may range from a minimum BPA value required for server 206-1 to operate to a maximum BPA value allowing higher-frequency operation of server 206-1 while still preventing uncontrolled power excursions. PS-VAL 220-1 stored in NVRAM device 214-1 may be O-BPAR 232-1 calculated by system management controller 208-1.

In one or more embodiments, system management controller 208-1 may calculate an optimal BPAR value based on the power capability of server 206-1. System management controller 208-1 may read a user power cap value stored in NVRAM device 214-1. System management controller 208-1 may then calculate a minimum power state value as the minimum of the calculated optimal BPAR value and the user power cap value. PS-VAL 220-1 stored in NVRAM device 214-1 may be the calculated minimum power state value. When PS-IND 218-1 indicates that power state limiting is disabled, the power supplied to CPU 210-1 may be unconstrained.

In one or more embodiments, when PS-IND 218-1 indicates that power state limiting is disabled, BIOS 216-1 may read a second PS-IND 218-3 value (not shown in FIG. 2) stored in NVRAM device 214-1. When PS-IND 218-3 value indicates that power state limiting is enabled, BIOS 216-1 may read a second PS-VAL 220-3 stored in NVRAM device 214-1 and program PS-IND 218-3 of CPU 210-1 to PS-VAL 220-3 to cause CPU 210-1 to limit power supplied to CPU 210-1 to less than or equal to PS-VAL 220-3. PS-VAL 220-3 may be greater than PS-VAL 220-1, which may allow server 206-1 to operate at a higher-performance while still preventing uncontrolled power excursions.

Chassis management controller 204 and each system management controller 206 may utilize both the power state limiting feature and the O-BPAR feature, previously described, to optimize power budgeting and allocations for each server 206 in operation within chassis 202. System management controller 208-1 may calculate an O-BPAR 232-1 value and a range of BPA values based on a power capability of server 206-1, as described above. System management controller 208-2 may also calculate an O-BPAR 232-2 value and a range of BPA values based on a power capability of server 206-2.

When power state limiting is enabled, chassis management controller 204 may receive O-BPAR 232-1 value and the corresponding range of BPA values from system management controller 208-1 and may receive O-BPAR 232-2 value and the corresponding range of BPA values from system management controller 208-2. Chassis management controller 204 may calculate a third BPAR value for server 206-1 and a fourth BPA value for server 206-2 based on a chassis power budget, O-BPAR 232-1 value and the corresponding range of BPA values, and O-BPAR 232-2 value and the corresponding range of BPA values. The third BPA value may be within the range of BPA values corresponding to O-BPAR 232-1 and the fourth BPA value may be within the range of BPA values corresponding to O-BPAR 232-2. Chassis management controller 204 may send the third BPA value to system management controller 208-1. When power state limiting is enabled, the power supplied to CPU 210-1 may be limited to the third BPA value. Chassis management controller 204 may send the fourth BPA value to system management controller 208-2. When power state limiting is enabled, the power supplied to CPU 210-2 may be limited to the fourth BPA value.

When power state limiting transitions from enabled to disabled, chassis management controller 204 may re-allocate, re-factor, the power supplied to server 206-1 from O-BPAR 232-1 value to a first BPA value and re-allocate, re-factor, the power supplied to server 206-2 from O-BPAR 232-2 value to a second BPA value. Chassis management controller 204 may also, when power state limiting transitions from disabled to enabled, re-allocate, re-factor, the power supplied to server 206-1 from the first BPA value to O-BPAR 232-1 value, and re-allocate, re-factor, the power supplied to server 206-2 from the second BPA value to O-BPAR 232-2 value. O-BPAR 232-1 value may be less than the first BPA value. O-BPAR 232-2 value may be less than the second BPA value. In one or more embodiments, the third BPA value may be less than O-BPAR 232-1. Chassis management controller 204 may also receive a user power cap value from a user interface of chassis management controller 204. The calculation of the third BPA value and the calculation of the fourth BPA value may be further based on the user power cap value. The sum of the third BPA value and the fourth BPA value may be less than or equal to the user power cap value. The user power cap value may be less than the sum of the power capability of server 206-1 and the power capability of server 206-2.

By re-allocating, re-factoring, with the O-BPAR 232 values, any trapped power will be freed and may be re-allocated to other servers 206 of chassis 202 because the amount of power chassis management controller 204 needs to budget during boot-time of a server 206 is reduced by a trapped power amount. This trapped power is then available for re-allocation. If a new server 206, e.g. server 206-3 (not shown in FIG. 2) is powered on when power state limiting is enabled, server 206-3 will request O-BPAR 232 associated with server 206-3 from chassis management controller 204 from the beginning and will not require refactoring.

Figure 3:
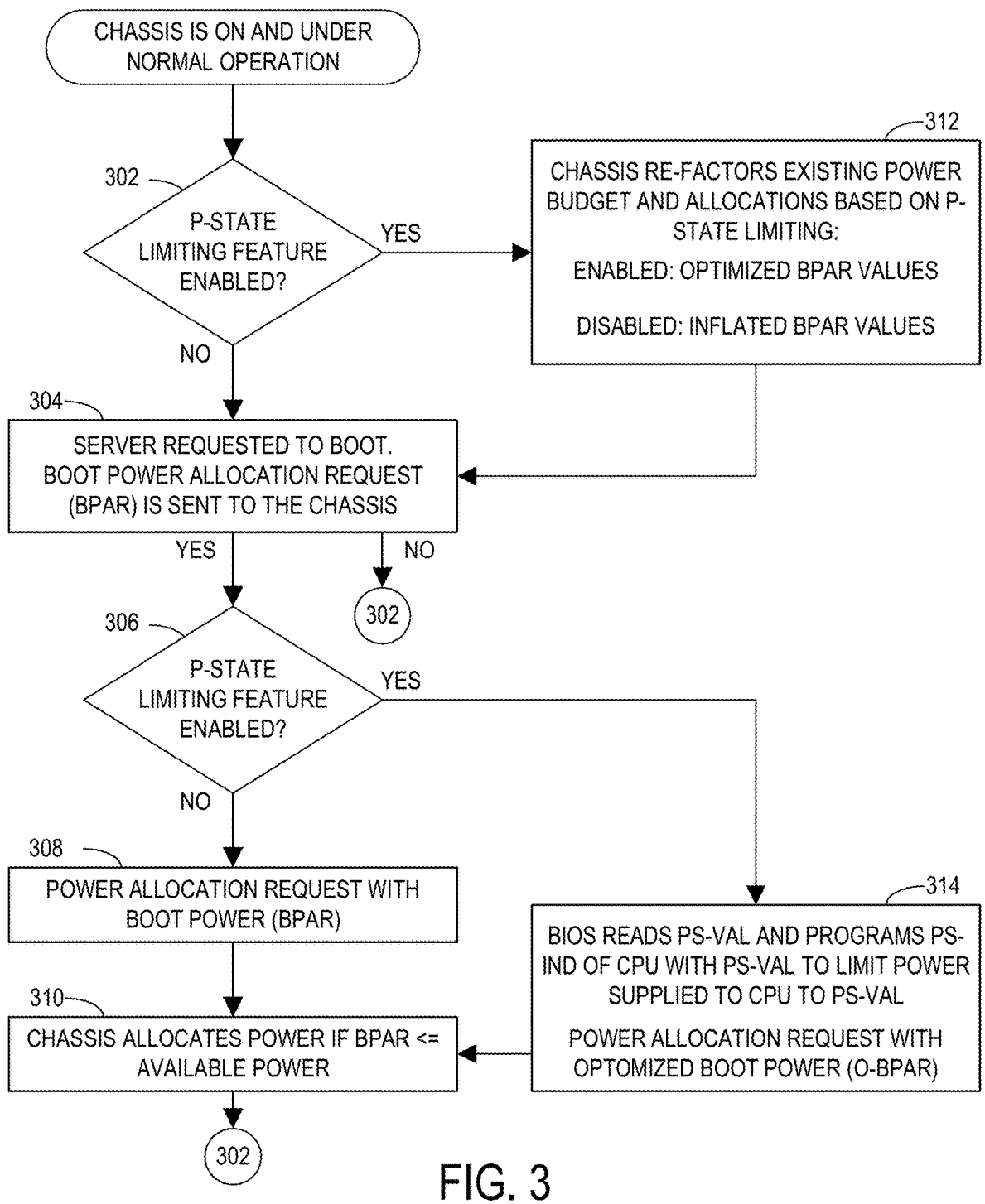
FIG. 3 is a flowchart depicting selected elements of an embodiment of a method for power allocation during boot using power state limiting.

FIG. 3 is a flowchart depicting selected elements of an embodiment of a method 300 for power allocation during boot using power state limiting. Method 300 may be performed by information handling system 100, information handling system 200, previously described with reference to FIGS. 1 and 2, or another information handling system. It is noted that certain operations described in method 300 may be optional or may be rearranged in different embodiments.

Method 300 may begin at step 302, by determining, by system management controller 208-1, whether power state limiting is enabled. When power state limiting is enabled, method 300 proceeds to step 312. Otherwise, method 300 proceeds to step 304. At step 304, server 206-1 is powered on and is requested to boot. System management controller 208-1 may send a BPAR 234 to chassis management controller 204. At step 306, reading, by BIOS 216-1, PS-IND 218-1 from NVRAM device 214-1. Determining, by BIOS 216-1, whether PS-IND 218-1 indicates that power state limiting is enabled. When PS-IND 218-1 indicates that power state limiting is enabled, method 300 proceeds to step 314. Otherwise, method 300 proceeds to step 308. At step 308, BPAR 234-1 power is allocated to server 206-1 and the power supplied to CPU 210-1 may be unconstrained. At step 310, when BPAR 234-1 is less than or equal to available power, chassis management controller 204 may allocate power to other components in chassis 202. Method 300 may then proceed back to step 302. At step 312, chassis management controller 204 may re-factor existing power budgets and allocations based on whether power state limiting is enabled. When power state limiting is enabled, chassis management controller 204 may allocate power based on O-BPAR 232 values. When power state limiting is disabled, chassis management controller 204 may allocate power based on BPAR 234 values. BPAR 234 values may be greater than O-BPAR 232 values. At step 314, BIOS 216-1 may read PS-VAL 220-1 from NVRAM device 214-1. BIOS 216-1 may program PS-IND 218-1 of CPU 210-1 to PS-VAL 220-1 to cause CPU 210-1 to limit power supplied to CPU 210-1 to less than or equal to PS-VAL 220-1. PS-VAL 220-1 may have the value of O-BPAR 232 value.

Figure 4:
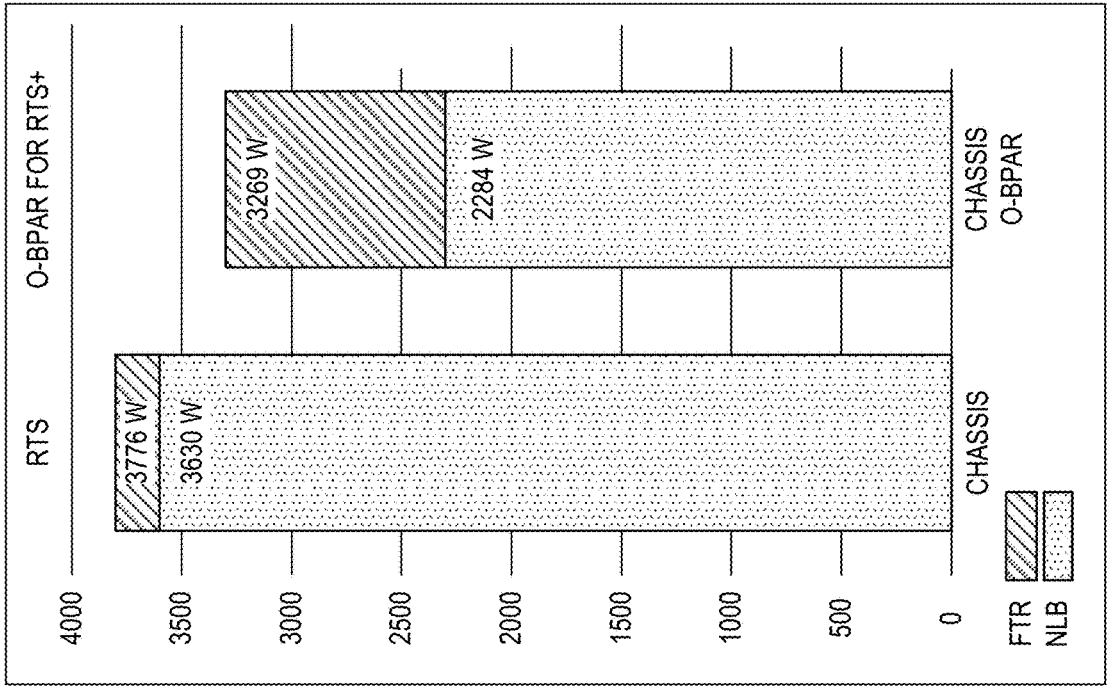
FIG. 4 are measurements and a graph of power budgets for an exemplary chassis for reduced boot power consumption using early BIOS controlled CPU power states to enhance power budgeting and allocation.
Figure 5:
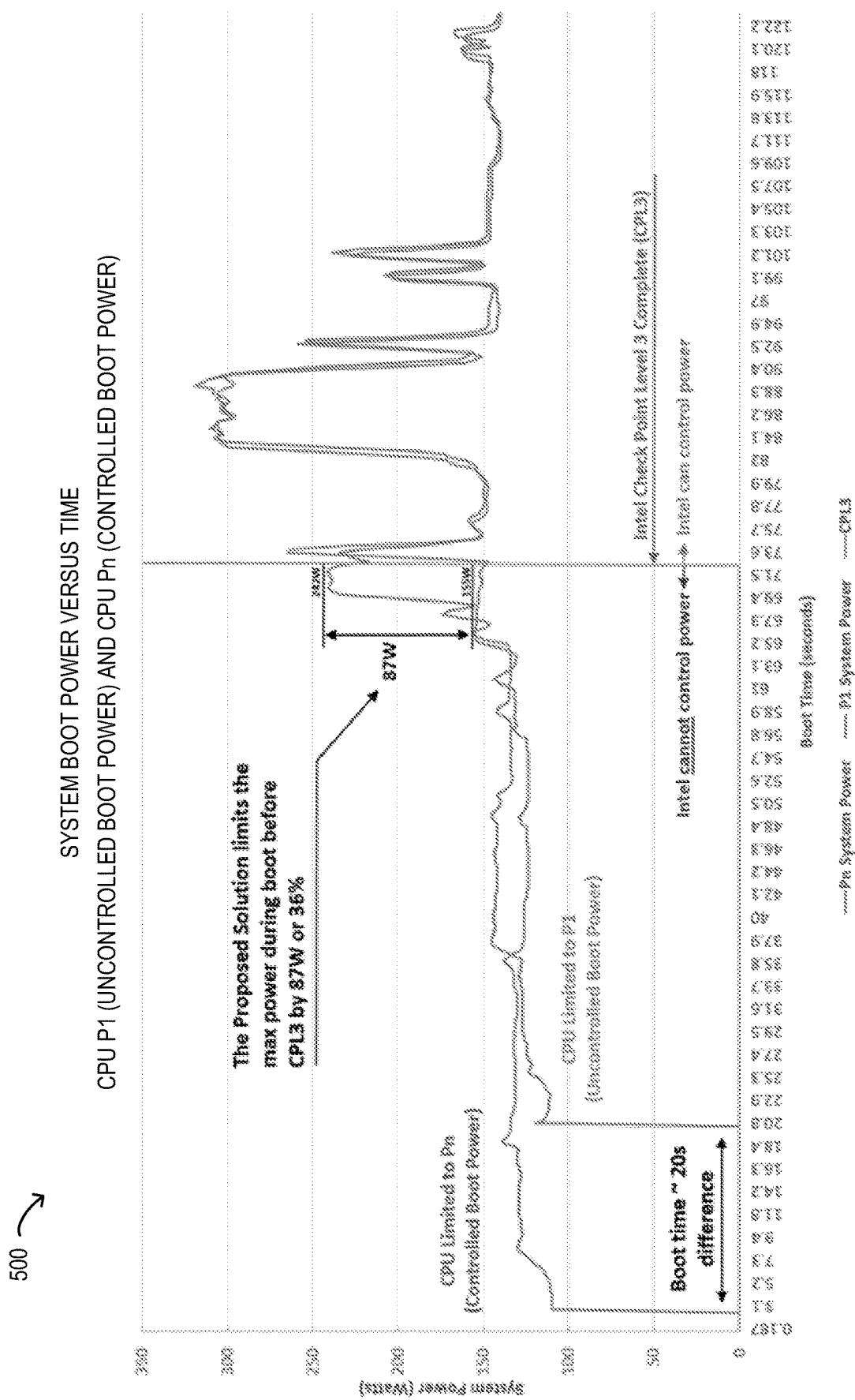
FIG. 5 is a graph of system boot power versus time consumption using early BIOS controlled CPU power states to enhance power budgeting and allocation.

FIG. 4 are measurements and a bar graph depicting power budgets for an exemplary chassis for reduced boot power consumption using early BIOS controlled CPU power states to enhance power budgeting and allocation. FIG. 5 is a graph depicting system boot power versus time consumption using early BIOS controlled CPU power states to enhance power budgeting and allocation.

In FIGS. 4 and 5, a server having 2× 200 W CPUs, 8× DIMMs, and 1× HDD used with a first BIOS that set the CPU power state to P1 during boot. A second, test, BIOS that set the CPU to a P1 power state during boot. As shown by the measurements in the table and the bar graph, server power was controlled, and no significant power spikes occurred prior to the BIOS checkpoint event, CPL3 when the CPU is limited to Pn vs. P1. The systems and methods as disclosed herein limited the maximum system power by 87 W which is a 36% improvement, and the boot time was approximately 20 seconds longer when limited to Pn which was measurable, but not excessive. The system performance and boot time, after the BIOS checkpoint event, CPL3, were also unaffected. The benefit of lower boot power (BPAR) and tradeoff of a slightly longer boot time were achieved only during the boot-time where boot power is otherwise uncontrolled without the disclosed solution. When these results were projected onto an existing chassis system for BPAR solution for two-socket, and four-socket, platforms the improvements were 480 W & 915 W to approximately 310 W & 590 W, respectively. In a system with 4 servers the solution would equate to approximately 1300 W of trapped power for NLB that is returned to the system for allocation to other devices, calculated as 4×(915 W−590 W)=1300 W.

Figure 6:
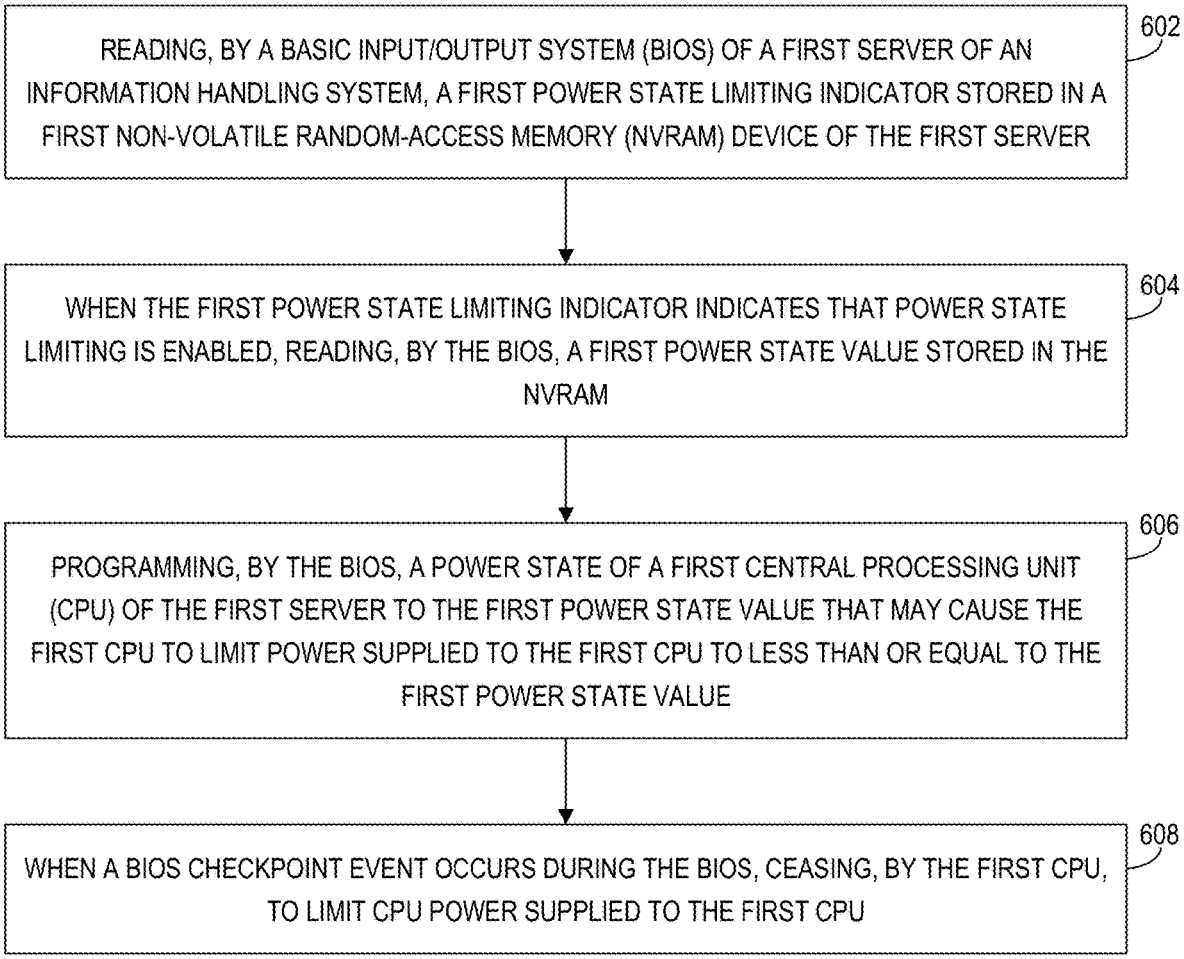
FIG. 6 is a flowchart depicting selected elements of an embodiment of a method for reduced boot power consumption using BIOS controlled CPU power states.

FIG. 6 is a flowchart depicting selected elements of an embodiment of a method for reduced boot power consumption using BIOS controlled CPU power states. Method 600 may be performed by information handling system 100, information handling system 200, previously described with reference to FIGS. 1 and 2, or another information handling system. It is noted that certain operations described in method 600 may be optional or may be rearranged in different embodiments.

Method 600 may begin at step 602, by reading, by a basic input/output system (BIOS) of a first server of an information handling system, a first power state limiting indicator stored in a first non-volatile random-access memory (NVRAM) device of the first server. At step 604, when the first power state limiting indicator indicates that power state limiting is enabled, reading, by the BIOS, a first power state value stored in the NVRAM. At step 606, programming, by the BIOS, a power state of a first central processing unit (CPU) of the first server to the first power state value that may cause the first CPU to limit power supplied to the first CPU to less than or equal to the first power state value. At step 608, when a BIOS checkpoint event occurs during the BIOS, ceasing, by the first CPU, to limit CPU power supplied to the first CPU. The BIOS checkpoint event may occur after the power state of the first CPU has been programmed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system (IHS), comprising:
   a first server comprising:
      a first central processing unit (CPU);
      a memory;
      a non-volatile random-access memory (NVRAM) device;
      a first performance state (P-state) limiting indicator stored in the NVRAM device;
      a first P-state value stored in the NVRAM; and
      a basic input/output system (BIOS) stored in the memory and operable when executed by the first CPU to:
         read a first power state limiting indicator stored in the NVRAM device; and
         when the first power state limiting indicator indicates that power state limiting is enabled:
            read a first power state value stored in the NVRAM; and
            program the power state of the first CPU to the first power state value to cause the first CPU to limit power supplied to the first CPU to less than or equal to the first power state value; and
         when a BIOS checkpoint event occurs during execution of the BIOS:
            the first CPU ceases to limit CPU power supplied to the first CPU,
            wherein the BIOS checkpoint event occurs after the power state of the first CPU has been programmed.

2. The information handling system of claim 1, wherein the first server further comprises:
   a first system management controller to, when power state limiting is enabled, calculate an optimal first boot power allocation (BPA) value and a first range of BPA values based on a power capability of the first server, wherein the optimal first BPA value is within the first range of BPA values, and wherein the first power state value stored in the NVRAM is the calculated optimal BPA value.

3. The information handling system of claim 1, wherein the first server further comprises:
   a first system management controller to:
      calculate an optimal BPA value based on a power capability of the first server;

read a user power cap value stored in the NVRAM;
calculate a minimum power state value as the minimum of the calculated optimal BPA value and the user power cap value, wherein the first power state value stored in the NVRAM is the minimum power state value.

4. The information handling system of claim 1, wherein, when the first power state limiting indicator indicates that power state limiting is disabled, the power supplied to the first CPU is unconstrained.

5. The information handling system of claim 1, wherein the BIOS further operable when executed by the first CPU to, when the first power state limiting indicator indicates that power state limiting is disabled:
read a second power state limiting indicator stored in the NVRAM device; and
when the second power state limiting indicator indicates that power state limiting is enabled:
read a second power state value stored in the NVRAM; and
program the power state of the first CPU to the second power state value to cause the first CPU to limit power supplied to the first CPU to less than or equal to the second power state value, wherein the second power state value is greater than the first power state value.

6. The information handling system of claim 1, wherein the information handling system further comprises:
a second server; and
a chassis management controller to:
when power state limiting transitions from enabled to disabled:
re-allocate the power supplied to the first server from a first optimized BPA value to a first BPA value; and
re-allocate the power supplied to the second server from a second optimized BPA value to a second BPA value; and
when power state limiting transitions from disabled to enabled:
re-allocate the power supplied to the first server from the first BPA value to the first optimized BPA; and
re-allocate the power supplied to the second server from the second BPA value to the second optimized BPA value, wherein the first optimized BPA value is less than the first BPA value, and wherein the second optimized BPA value is less than the second BPA value.

7. The information handling system of claim 1, wherein the first server further comprises:
a first system management controller to calculate an optimal first BPA value and a first range of BPA values based on a power capability of the first server, and
wherein the information handling system further comprises:
a second server comprising:
a second CPU; and
a second system management controller to calculate an optimal second BPA value and a second range of BPA values based on a power capability of the second server; and
a chassis management controller to, when power state limiting is enabled:
receive the optimal first BPA value and the first range of BPA values from the first system management controller;
receive the optimal second BPA value and the second range BPA values from the second system management controller;
calculate a third BPA value for the first server and a fourth BPA value for the second server based on a chassis power budget, the optimal first BPA value, the first range of BPA values, the optimal second BPA value, and the second range of BPA values, wherein the third BPA value is within the first range of BPA values and the fourth BPA value is within the second range of BPA values;
send the third BPA value to the first system management controller, wherein, when power state limiting is enabled, the power supplied to the first CPU is limited to the third BPA value; and
send the fourth BPA value to the second system management controller, wherein, when power state limiting is enabled, the power supplied to the second CPU is limited to the fourth BPA value.

8. The information handling system of claim 7, wherein the third BPA value is less than the optimal first BPA value.

9. The information handling system of claim 7, wherein the chassis management controller further to:
receive a user power cap value from a user interface of the chassis management controller, wherein the calculation of the third BPA value and the fourth BPA value is further based on the user power cap value, and wherein the sum of the third BPA value and the fourth BPA value is less than or equal to the user power cap value.

10. The information handling system of claim 9, wherein the user power cap value is less than the sum of the power capability of the first server and the power capability of the second server.

11. A method, comprising:
reading, by a basic input/output system (BIOS) of a first server of an information handling system, a first power state limiting indicator stored in a first non-volatile random-access memory (NVRAM) device of the first server; and
when the first power state limiting indicator indicates that power state limiting is enabled:
reading, by the BIOS, a first power state value stored in the NVRAM; and
programming, by the BIOS, a power state of a first central processing unit (CPU) of the first server to the first power state value to cause the first CPU to limit power supplied to the first CPU to less than or equal to the first power state value; and
when a BIOS checkpoint event occurs during the BIOS:
ceasing, by the first CPU, to limit CPU power supplied to the first CPU,
wherein the BIOS checkpoint event occurs after the power state of the first CPU has been programmed.

12. The method of claim 11, wherein the method further comprises:
when power state limiting is enabled, calculating, by a first system management controller of the first server, an optimal first boot power allocation (BPA) value and a first range of BPA values based on a power capability of the first server, wherein the optimal first BPA value is within the first range of BPA values, and wherein the first power state value stored in the NVRAM is the calculated optimal BPA value.

13. The method of claim 11, wherein the method further comprises:
calculating, by a first system management controller of the first server, an optimal BPA value based on a power capability of the first server;
reading, by the first system management controller, a user power cap value stored in the NVRAM;
calculating, by the first system management controller, a minimum power state value as the minimum of the calculated optimal BPA value and the user power cap value, wherein the first power state value stored in the NVRAM is the minimum power state value.

14. The method of claim 11, wherein, when the first power state limiting indicator indicates that power state limiting is disabled, the power supplied to the first CPU is unconstrained.

15. The method of claim 11, wherein the method further comprises, when the first power state limiting indicator indicates that power state limiting is disabled:
reading, by the BIOS, a second power state limiting indicator stored in the NVRAM device; and
when the second power state limiting indicator indicates that power state limiting is enabled:
reading, by the BIOS, a second power state value stored in the NVRAM; and
programming, by the BIOS, the power state of the first CPU to the second power state value to cause the first CPU to limit power supplied to the first CPU to less than or equal to the second power state value, wherein the second power state value is greater than the first power state value.

16. The method of claim 11, wherein the method further comprises:
when power state limiting transitions from enabled to disabled:
re-allocating, by a chassis management controller of the information handling system, the power supplied to the first server from a first optimized BPA value to a first BPA value; and
re-allocating, by the chassis management controller, the power supplied to a second server of the information handling system from a second optimized BPA value to a second BPA value; and
when power state limiting transitions from disabled to enabled:
re-allocating, by the chassis management controller, the power supplied to the first server from the first BPA value to the first optimized BPA; and
re-allocating, by the chassis management controller, the power supplied to the second server from the second BPA value to the second optimized BPA value, wherein the first optimized BPA value is less than the first BPA value, and wherein the second optimized BPA value is less than the second BPA value.

17. The method of claim 11, wherein the method further comprises:
calculating, by a first system management controller of the first server, an optimal first BPA value and a first range of BPA values based on a power capability of the first server;
a second CPU; and
calculating, by a second system management controller of a second server, an optimal second BPA value and a second range of BPA values based on a power capability of the second server; and
when power state limiting is enabled:
receiving, by a chassis management controller of the information handling system, the optimal first BPA value and the first range of BPA values from the first system management controller;
receiving, by the chassis management controller, the optimal second BPA value and the second range BPA values from the second system management controller;
calculating, by the chassis management controller, a third BPA value for the first server and a fourth BPA value for the second server based on a chassis power budget, the optimal first BPA value, the first range of BPA values, the optimal second BPA value, and the second range of BPA values, wherein the third BPA value is within the first range of BPA values and the fourth BPA value is within the second range of BPA values;
sending, by the chassis management controller, the third BPA value to the first system management controller, wherein, when power state limiting is enabled, the power supplied to the first CPU is limited to the third BPA value; and
sending, by the chassis management controller, the fourth BPA value to the second system management controller, wherein, when power state limiting is enabled, the power supplied to the second CPU is limited to the fourth BPA value.

18. The method of claim 17, wherein the third BPA value is less than the optimal first BPA value.

19. The method of claim 17, wherein the method further comprising:
receiving, by the chassis management controller, a user power cap value from a user interface of the chassis management controller, wherein the calculation of the third BPA value and the fourth BPA value is further based on the user power cap value, and wherein the sum of the third BPA value and the fourth BPA value is less than or equal to the user power cap value.

20. The method of claim 19, wherein the user power cap value is less than the sum of the power capability of the first server and the power capability of the second server.

* * * * *